G. J. TSCHEULIN.
Device for Transmitting Power.
No. 163,281.                                    Patented May 11, 1875.
— FIG-I —                    — FIG-II —
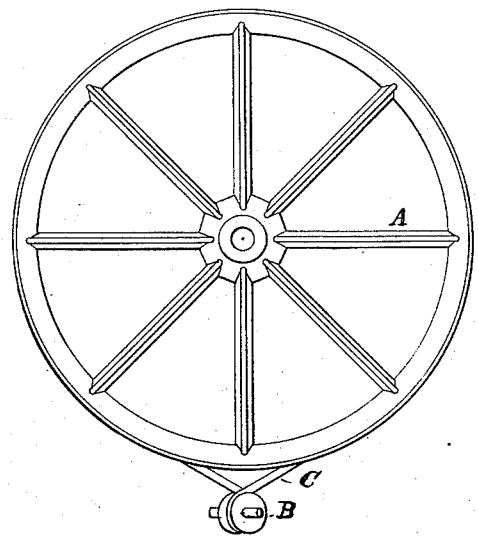 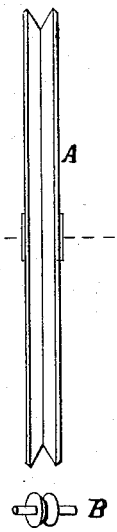
— FIG-IV —
— FIG-III —
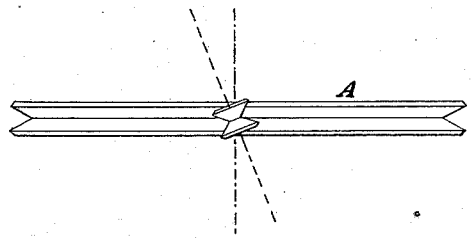 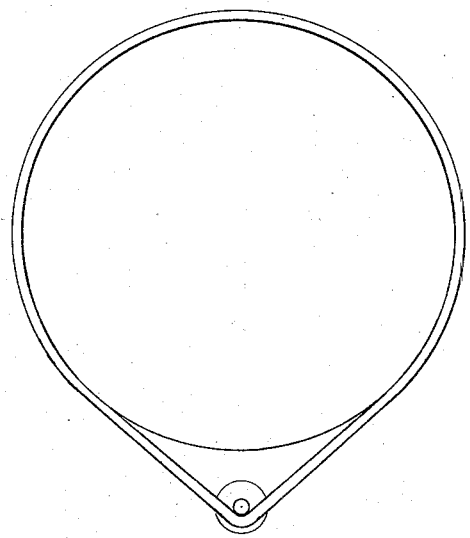
WITNESSES.                            INVENTOR.
Edwin H. Howard.                   George J. Tscheulin,
W. W. Wharton                       by G.H. & W.S. Howard,
                                                          his Attys.
THE GRAPHIC CO.PHOTO-LITH.39 & 41 PARK PLACE,N.Y.

UNITED STATES PATENT OFFICE.

GEORGE J. TSCHEULIN, OF BALTIMORE, MARYLAND.

IMPROVEMENT IN DEVICES FOR TRANSMITTING POWER.

Specification forming part of Letters Patent No. 163,281, dated May 11, 1875; application filed December 29, 1874.

*To all whom it may concern:*

Be it known that I, GEORGE J. TSCHEULIN, of the city of Baltimore and State of Maryland, have invented certain new and useful Improvements in Means for the Transmission of Power, of which the following is a specification; and I do hereby declare that in the same is contained a full, clear, and exact description of my said invention, reference being had to the accompanying drawing and to the letters of reference marked thereon.

My invention relates to an improved method of transmitting rotary motion from one wheel or pulley to another, and is specifically applicable in cases where an extreme disparity in the diameters of the said wheels or pulleys exists, and is adaptable alike to a system in which the primary moving wheel in said system is the smaller one, or to one in which the larger wheel is the prime mover, or the pulley acted upon by means of a belt, series of gear-wheels, or other mechanical devices receiving movement from the prime mover.

My invention consists in the adaptation of a crossed belt, having a circular cross-section, or a cross-section represented by a figure approximating to a circle, to a system of two or more pulleys or wheels having grooved edges, the said wheels or pulleys being secured to, or fitted to revolve upon, spindles or shafts, the axes of which vary in their direction of revolution in such manner as to cause the two parts of said belt, at the point of crossing, to be separated from each other, as and for the purposes hereinafter fully described.

In the further description of my invention which follows, due reference must be had to the accompanying drawing, forming a part of this specification, and in which—

Figure 1 is an exterior view of two pulleys connected by a belt in accordance with my invention, and Fig. 2 an edge view of the said pulleys without the belt. Fig. 3 is a plan of the pulleys, also without the belt; and Fig. 4, an exterior view of two pulleys, showing their connection by means of a belt in the ordinary manner.

Similar letters of reference indicate similar parts in all the figures.

A represents the larger pulley, and B the smaller one. C is the belt, which is crossed, in order to increase the portions of the peripheries of said pulleys in contact with and acted upon by the belt. The pulleys A and B do not revolve in a common plane, owing to the divergence of the shafts from parallel lines, the axial divergence, as shown in Fig. 3, being such as to allow the two parts of the belt, at the crossing-point $a$ in Fig. 1, to run clear, or pass in opposite directions, without coming into contact. By this means all wear of the belt other than the natural deterioration of the material, and that consequent upon the intermittent contact of the belt with the surface of the pulleys, is obviated; and, as the grooved surface of the pulleys brought into contact with the belt is greatly increased, the belt can be used at a very low tension, thus preventing excessive wear of the journals of the shafts, or the inner surfaces of hubs of the pulleys, where fixed shafts are used.

In the usual method of connecting pulleys of widely differing diameters placed in close proximity to each other by means of belts, as shown in Fig. 4, the lack of friction resulting from the limited portion of the periphery of the smaller pulley brought into contact with and acted upon by the belt is partially compensated by giving excessive tension to the belt, which necessarily causes undue wear of the rubbing surfaces of the shafts and other parts.

With such an arrangement of pulleys as is shown in Fig. 4, and with a belt as tight as practicable, I have been unable to attain for hand forge-blowers, in the manufacture of which I am at present engaged, a speed exceeding twelve hundred revolutions per minute; but in blowers constructed in accordance with my invention, and in which the diameters of the pulleys have a ratio of thirty to one, I can easily attain, with a comparatively loose belt, a speed of two thousand revolutions per minute, and that without serious wear of the rubbing surfaces resulting therefrom.

Having thus described my invention, what I claim as new, and desire to secure by Letters Patent of the United States, is—

In combination with a grooved wheel or pulley adapted to revolve in a certain plane, a correspondingly-grooved pulley constructed to revolve in a plane inclined with reference to the plane aforesaid, the said pulleys being connected by a crossed belt of a circular or nearly circular cross-section, substantially as and for the purpose set forth.

In testimony whereof I have hereunto subscribed my name this 21st day of December, in the year of our Lord 1874.

GEORGE J. TSCHEULIN.

Witnesses:
FREDERICK KLOMAN,
P. H. BENNER.